United States Patent
Oda et al.

(10) Patent No.: US 6,795,119 B1
(45) Date of Patent: Sep. 21, 2004

(54) SOLID-STATE IMAGE PICKUP APPARATUS FOR PRODUCING IMAGE SIGNALS WITH PIXEL SIGNALS MIXED IN A HORIZONTAL DIRECTION AND A SIGNAL READING METHOD FOR THE SAME

(75) Inventors: Kazuya Oda, Asaka (JP); Masafumi Inuiya, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 803 days.

(21) Appl. No.: 09/657,819

(22) Filed: Sep. 8, 2000

(30) Foreign Application Priority Data

Sep. 10, 1999 (JP) ............................................ 11-257139

(51) Int. Cl.⁷ .............................. H04N 3/14; H04N 9/68; H04N 5/335
(52) U.S. Cl. ........................ 348/273; 348/237; 348/234; 348/283; 348/305; 348/317; 348/320
(58) Field of Search ................................. 348/320, 317, 348/305, 283, 234, 237, 273

(56) References Cited

U.S. PATENT DOCUMENTS

| | | | |
|---|---|---|---|
| 5,485,204 A | * | 1/1996 | Taniji .......................... 348/264 |
| 5,686,742 A | * | 11/1997 | Takeuchi ..................... 257/233 |
| 5,844,598 A | * | 12/1998 | Janesick ....................... 348/79 |
| 5,894,143 A | * | 4/1999 | Tanigawa et al. ........... 257/236 |
| 6,421,087 B1 | * | 7/2002 | Ikeda .......................... 348/345 |
| 2002/0118291 A1 | * | 8/2002 | Ishigami et al. ............ 348/311 |

FOREIGN PATENT DOCUMENTS

JP           A10136391           5/1998

* cited by examiner

Primary Examiner—Wendy R. Garber
Assistant Examiner—James M. Hannett
(74) Attorney, Agent, or Firm—Birch, Stewart, Kolasch & Birch, LLP (57) ABSTRACT

A solid-state image pickup apparatus includes a timing signal feeding section for outputting signals assigned to a preliminary pickup mode as well as signals assigned to an actual pickup mode that follows the preliminary pickup mode. In the preliminary pickup mode, signal charges read out of photodiodes are mixed and read out via a horizontal transfer path as if they were reduced in the horizontal direction, thereby increasing a substantial transfer rate. A signal processor includes a preliminary pickup processing circuit. The preliminary pickup processing circuit performs calculations with digital data derived from the mixed signal charges. As a result, the representative primary colors R (red), G (green) and B (blue) of a plurality of signal charges are produced from the mixed, reduced signals by approximation or within a preselected horizontal range. A luminance signal and chrominance signals are then produced from the above colors R, G and B. The apparatus successfully reduces signal reading time and enhances image quality.

17 Claims, 5 Drawing Sheets

SOLID-STATE IMAGE PICKUP APPARATUS FOR PRODUCING IMAGE SIGNALS WITH PIXEL SIGNALS MIXED IN A HORIZONTAL DIRECTION AND A SIGNAL READING METHOD FOR THE SAME

BACKGROUND OF THE INVENTION

1. Field of the Invention

The present invention relates to a solid-state image pickup apparatus and a signal reading method for the same. More particularly, the present invention relates to a solid-state image pickup apparatus advantageously applicable to a digital camera, an image input apparatus or the like including an image sensor with high pixel density, e.g., more than several millions of pixels, particularly operable in a preliminary pickup mode.

2. Description of the Background Art

To implement image quality comparable with one available with a silver halide photo-sensitive type of film, there have been proposed various technologies for increasing the number of pixels of a digital camera that electrically shoots a scene. Japanese patent laid-open publication No. 136391/1998, for example, discloses a solid-state image pickup apparatus constructed to optimize the spatial sampling of an image, to shift pixels with respect to each other in such a manner as to enhance efficient receipt of light, and to reduce moire and other aliasing signals.

A digital camera of the type including an image sensor provided with high pixel density is extensively used and directed toward high image quality. It is a common practice with this type of digital camera to effect, before the actual pickup or still shot of a desired scene, AE/AF (Automatic Exposure/Automatic Focusing) operation and movie drive that causes the scene being picked up to appear on an LCD (Liquid Crystal Display). This, however, brings about a problem that the high pixel density increases the period of time necessary for signal charges resulting from the pickup to be read out and thereby lowers the frame rate. It is to be noted that high pixel density refers to more than 1,000,000 pixels or so-called megapixels.

To increase the frame rate, signal charges generated in the image sensor may be read out while being reduced, or thinned, in the vertical direction, as proposed in the past. Specifically, assume that drive frequency CLK for reading out all of 1500,000 pixels (1,280×1,024) by progressive scanning is 12.2725 MHZ. Then, a single horizontal synchronizing period (1H) and a single vertical synchronizing period (1V) are 1,560 CLK and 1,050H, respectively, so that the frame rate is 1/7.5 second. When the signal charges are reduced to one-half in the vertical direction, 1H needs the same period of time while 1V is 525H, resulting in a frame rate of 66.7 milliseconds, i.e., 1/15 second. Even when the signal charges are reduced to one-fourth in the vertical direction, 1V is 262.6H, and therefore the frame rate is as long as 33.4 millisecond or 1/30 second.

Assume that 1,500,000 pixels are read out by progressive scanning and displayed by the movie drive and progressive scanning in the conventional image size, i.e., 640×480. Then, the pixels are reduced to one-half in the horizontal and vertical directions under the above-described conditions. As a result, the number of pixels in the horizontal direction and the number of pixels (lines) in the vertical direction are as great as 640 and 525, respectively. Reduction to one-fourth in the vertical direction effects reduction to one-half in the horizontal direction and thereby reduces the number of lines in the vertical direction to 262.5, improving the frame rate. However, because the number of lines reduced in the vertical direction is short of 480, interpolation must be executed in the vertical direction in order to match the number of lines to the desired number.

On the other hand, in the horizontal direction, all of the 1,280 pixels are read out and then reduced to 640 pixels at the subsequent signal processing stage. It will therefore be seen that strict consideration is not given to the improvement in frame rate in reducing the pixels in the horizontal direction. This is apt to prevent the operator of the camera from missing an adequate actual pickup timing.

SUMMARY OF THE INVENTION

It is therefore an object of the present invention to provide a solid-state image pickup apparatus capable of improving the signal output rate during preliminary pickup despite high pixel density or image quality and preliminarily reading out signals in color without effecting actual pickup to follow, and a signal reading method for the same.

In accordance with the present invention, a solid-state image pickup apparatus includes an image pickup section, a signal processing section for executing digital signal processing, and a signal feeding section. The image pickup section includes photosensitive cells arranged bidimensionally and each being shifted from the adjoining photosensitive cells in the horizontal and vertical directions for photoelectrically transducing incident light. A color filter has color filter segments each being positioned in front of a particular photosensitive cell in the direction of light incidence for separating colors of incident light representative of a scene. Vertical transfer paths transfer signal charges, which are read out of the photosensitive cells, in the vertical direction corresponding to the direction of columns of the bidimensional arrangement of the photosensitive cells. A horizontal transfer path extends in the direction substantially perpendicular to the vertical transfer paths for transferring the signal charges input thereto from the vertical transfer paths in response to horizontal drive signals. Transfer electrodes each are positioned between a particular photosensitive cell and the vertical transfer path adjoining the photosensitive cell. The signal feeding section feeds transfer timing signals to the transfer electrodes for causing the signal charges to be delivered from the photosensitive cells to the vertical transfer paths. Also, the signal feeding section feeds vertical drive signals to the vertical transfer paths for causing the signals charges to be transferred along the vertical transfer paths to the horizontal transfer path. Further, the signal feeding section feeds the horizontal drive signals to the horizontal transfer path for causing the signal charges to be transferred along the horizontal transfer path. The signal feeding section causes the signal charges to be transferred in a particular manner in each of an actual pickup mode, in which the signal charges are read out of substantially all of the photosensitive cells, and a preliminary pickup mode preceding the actual pickup mode. The signal processing section includes an image signal generating circuit assigned to the preliminary pickup mode for performing calculations with the signal charges read out in a mixture to thereby generate a luminance signal and chrominance signals.

Also, in accordance with the present invention, a signal reading method begins with the step of preparing the image pickup section having the above-described configuration. Transfer timing signals are fed for rendering the transfer electrodes conductive to thereby transfer the signal charges from the photosensitive cells to the vertical transfer paths. Vertical drive signals are fed to the vertical transfer paths for transferring the signal charges along the vertical transfer paths to the horizontal transfer path. Further, in a preliminary pickup mode, horizontal drive signals are fed to the horizontal transfer path for mixing some of the signal charges to thereby output mixed signals. The mixed signals are transferred along the horizontal transfer path with a timing for improving a horizontal drive rate being adjusted. As a result, the signal charges are read out of the photosensitive cells as signals in a preliminary pickup mode preceding an actual pickup mode in which signal charges are read out of substantially all of the photosensitive cells.

Further, in accordance with the present invention, a signal reading method begins with preparing the above-described image pickup section. When the color filter has a G (green) square lattice, RB (red and blue) full-checker pattern, transfer timing signals are fed for rendering the transfer electrodes conductive to thereby transfer the signal charges from the photosensitive cells to the vertical transfer paths. Vertical drive signals are fed to the vertical transfer paths for transferring the signal charges along the vertical transfer paths to the horizontal transfer path. Further, in a preliminary pickup mode, horizontal drive signals are to the horizontal transfer path for reading out the signal charges having been mixed during horizontal transfer along the horizontal transfer path while adjusting a timing for mixing some of the signal charges. The resulting mixed signal charges are digitized to thereby output pixel data. A luminance signal and chrominance signals representative of a scene being picked up are generated on the basis of the above pixel data in a preliminary pickup mode preceding an actual pickup mode in which the charges are read out of substantially all of the photosensitive cells.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
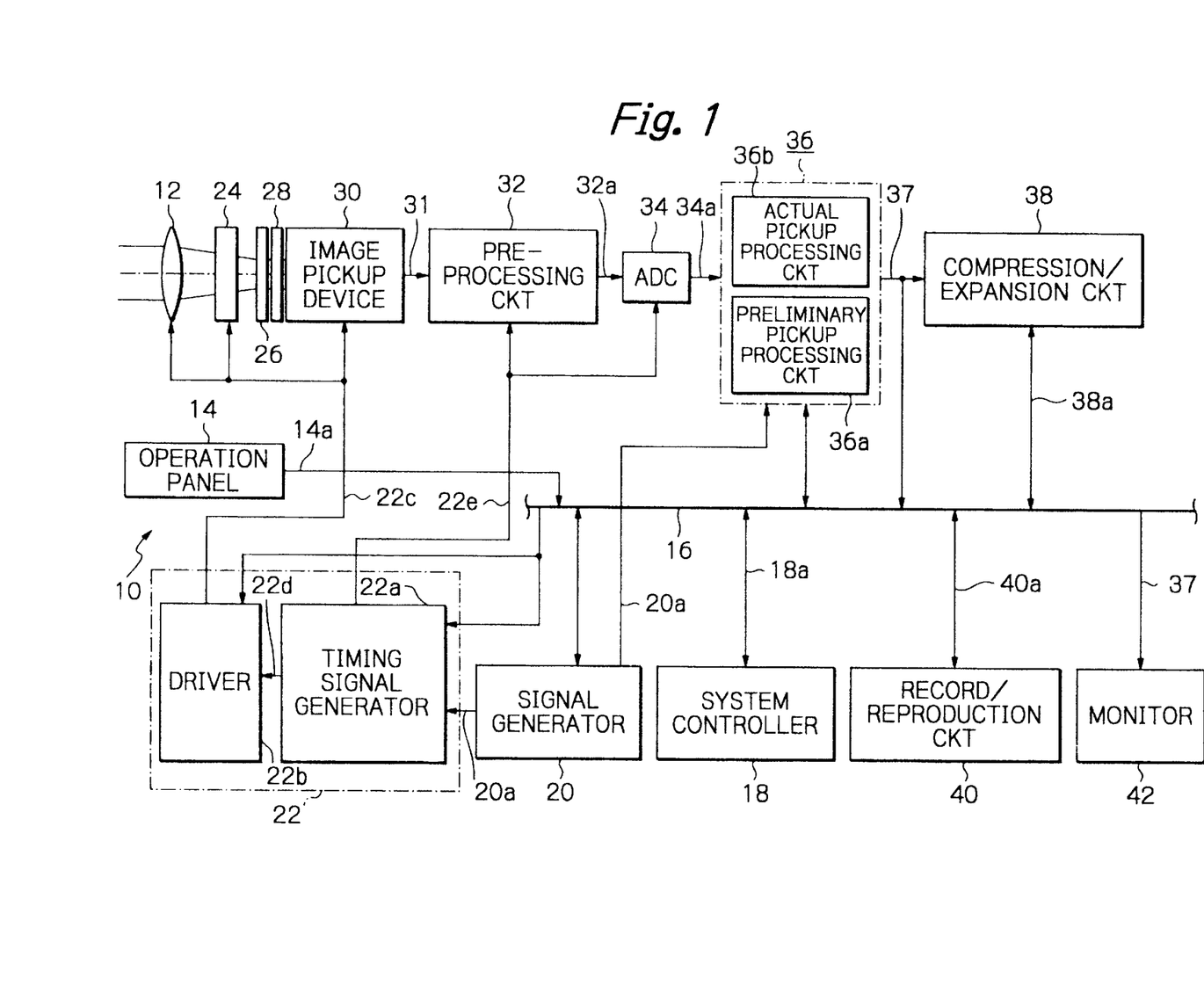
FIG. 1 is a block diagram schematically showing a solid-state image pickup apparatus embodying the present invention and implemented as a digital still camera.

Referring to FIG. 1 of the drawings, a solid-state image pickup apparatus embodying the present invention is shown and implemented as a digital still camera 10 by way of example. Part of the digital still camera 10 not relevant to the understanding of the present invention is not shown or described. In FIG. 1, signals are designated by the reference numerals attached to signal lines on which they appear. As shown, the camera 10 includes a lens system 12, an operation panel 14, a system controller 18, a signal generator 20, a timing signal feeding section 22, a diaphragm adjusting mechanism 24, an optical low-pass filter 26, and a color filter 28. The camera 10 further includes an image pickup device or image sensor 30, a preprocessing circuit 32, an ADC (Analog-to-Digital Converter) 34, a signal processor 36, a compression/expansion circuit 38, a record/reproduction circuit 40, and a monitor 42.

The lens system 12 is representative of an assembly of a plurality of optical lenses and includes a zoom mechanism and an AF control mechanism although not shown specifically. The zoom mechanism controls the positions of the lenses and therefore the angle of field in accordance with a signal 14a output from the operation panel 14. The AF control mechanism automatically controls the focus on the basis of a distance between the camera 10 and a desired subject. The operation panel 14 includes a shutter release button, not shown, capable of being pressed to a half-stroke position and then to a full-stroke position. When the operator of the camera 10 presses the shutter releases button to, e.g., the half-stroke position, the camera 10 preliminarily picks up a scene (preliminary pickup hereinafter) before actual pickup to follow. The zoom mechanism and AF mechanism are controlled in accordance with information derived from the preliminary pickup. The signal 14a is also delivered to the system controller 18 over a system bus 16. The timing signal feeding section 22 is made up of a timing signal generator 22a and a driver 22b. A drive signal 22c is fed to the lens system 12 via the signal generator 20, the timing signal generator 22a, and driver 22b. After the focus, exposure and so forth have been set on the basis of the information derived from the preliminary pickup, the operator presses the shutter release button to the full-stroke position in order to actually shoot the scene. The resulting pickup timing is fed to the system controller 18. In response, the system controller 18 executes pickup control including the image pickup and signal read-out.

The operation panel 14 allows the operator to select desired one of items that may be displayed on the monitor 42. The shutter release button sends the signal 14a to the system controller 18 on the system bus 16 such that the camera 10 operates in a particular manner in accordance with each of the half-stroke and full-stroke positions of the shutter release. In the illustrative embodiment, the operation panel 14 additionally includes a pointing device for indicating a cursor or menu to be displayed on the monitor 42. The pointing device allows the operator to select desired modes in the event of various kinds of operation and processing. The signal 14a input to the system controller 18 is representative of various signals resulting from such functions available with the operation panel 14.

The system controller 18 includes, e.g., a CPU (Central Processing Unit) and a ROM (Read Only Memory) storing programs for operating the camera 10. The system controller 18 generates control signals 18a meant for the various sections of the camera 10 in accordance with, e.g., information derived from the manipulation of the operation panel 14 and the programs stored in the ROM. Specifically, the control signals 18a are delivered not only to the signal generator 20 but also to the timing signal feed section 22, preprocessing circuit 32, ADC 34, signal processor 36, compression/expansion circuit 38, record/reproduction circuit 40, and monitor 42. Signal lines extending from the system controller 18 to the blocks 22 and 32 through 42 are not shown in FIG. 1. While controlling the above various blocks, the system controller 18 causes the timing signal feeding section 22 to generate particular timing signals for each of preliminary pickup and actual pickup on the bus 16. Further, the controller 18 executes unique control over the signal processor 36, as will be described specifically later.

The signal generator 20 includes an oscillator, not shown, for generating a system clock 20*a* under the control of the system controller 18. The system clock 20*a* is fed to the timing signal feeding section 22 and signal processor 36. Also, the system clock 20*a* is applied to the system controller 18 on, e.g., the system bus 16 as a reference timing signal. Further, the system clock 20*a* is fed to the signal processor 36 as a sampling signal for sampling pixel data. In the illustrative embodiment, the pixel data are derived from mixed signal charges that have been transformed to voltage signals, then digitized and then input to the signal processor 36, as will be described specifically layer. The signal generator 20 delivers to the signal processor 36 a clock for calculation using the sampled pixel data and a timing signal for signal processing in addition to the above sampling signal (see FIG. 6).

In the timing signal feeding section 22, the timing signal generation 22*a* includes a circuit for transforming, based on the control signal 18*a*, the system clock 20*a* to timing signals 22*d* used to control the various sections of the camera 10. The timing signals 22*d* include transfer shift gate pulses, vertical transfer timing signals, and horizontal transfer timing signals. Generally, each timing signal 22*d* is fed at a particular timing and provided with a particular frequency for each of preliminary pickup and actual pickup. For preliminary pickup, however, each timing signal 22*d* basically is not varied in frequency (particularly as to horizontal read-out) and is fed at a timing different from the timing assigned to actual pickup. Specifically, the timing of the horizontal drive signals is varied. It follows that the transfer shift gate pulses and vertical transfer timing signals are fed during image pickup at the same timing as during actual pickup. That is, the preliminary pickup and actual pickup can share the same signals.

The image pickup device 30 includes photodiodes or photosensitive cells while the color filter 28 includes color filter segments arranged in a G square, RB full-checker pattern, as will be described specifically later with reference to FIG. 2. The color filter segments each are assigned to a particular photodiode. Signal charges are read out of all of the photodiodes by progressive scanning. Vertical drive signals are fed to vertical transfer paths VR (see FIG. 2) for shifting the signal charges on two consecutive lines toward a horizontal transfer path HR (see FIG. 2) at a time, so that two lines are read out at the same time. More specifically, the timing signal generator 22*a* generates vertical transfer timing signals for implementing such simultaneous two-line read-out and causing three primary colors R, G and B to appear together on a single line.

The driver 22*b* generates the above vertical drive signals in accordance with the vertical transfer timing signals output from the timing signal generator 22*a*. If vertical pixel reduction is not executed with importance attached to the fact that such vertical drive is used during actual pickup also, then signal charges may be read out line by line. Vertical pixel reduction should be executed such that the positional relation between the colors is preserved even after the simultaneous two-line read-out. Consequently, when two lines are read out at the same time, a repetitive pattern "BGRGBGRGBGRG" appears on the horizontal transfer path HR.

The number of consecutive packets n to be driven by the horizontal drive signals as a horizontal drive unit is determined beforehand. In the illustrative embodiment, the number n is assumed to be six. Because six timing signals respectively fed to six packets are collectively dealt with, the six timing signals (or drive signals derived therefrom) are handled as unit horizontal drive signals to be sequentially fed. Specifically, the timing signal generator 22*a* first generates a first unit horizontal drive signal for forming a continuous potential well in five (n−1) consecutive packets included in the horizontal drive unit and forming a barrier in the remaining one packet of the same horizontal drive unit. The first unit horizontal drive signal fed via the driver 22*b* allows the above horizontal drive unit to be distinguished from adjoining horizontal drive units.

Subsequently, the timing signal generator 22*a* generates a second unit horizontal drive signal opposite in phase to the first unit horizontal drive signal. The second unit horizontal drive signal fed via the driver 22*b* causes signal charges stored in the five packets of the horizontal drive unit to be mixed together and collected in a single packet. Thereafter, the timing signal generator 22*a* generates a third unit horizontal drive signal for executing drive corresponding to six-phase drive with the above packet in which the signal charges have been collected. The third unit horizontal drive signal is continuously fed via the driver 22*b* until all of the signal charges on the horizontal transfer path HR have been output. This kind of drive successfully reduces a period of time necessary for the signal charges to be fully read out, i.e., signal reading time. If desired, the first and second unit horizontal drive signals may be alternately fed in place of the third unit horizontal drive signal. This also allows the signal charges to move over six electrodes at a time because the timing signals are collectively fed.

Part of the above-described transfer sequence effected by the timing signal generator 22*a* may be modified, as follows. After the generation of the first unit horizontal drive signal, the timing signal generator 22*a* alternately generates a fourth unit horizontal drive signal that forms a potential well and a barrier in each three consecutive packets (one-half of a single horizontal drive unit) and a fifth unit horizontal drive signal opposite in phase to the fourth unit horizontal drive signal. The fourth and fifth unit horizontal drive signals are continuously fed via the driver 22*b* until all of the signal charges on the horizontal transfer path HR have been output. This modification prevents packets, which can be transferred, from being packed with signal charges to saturation during horizontal drive in actual pickup and promotes rapid signal read-out by using two-phase drive. Because the modification causes the horizontal drive unit of charges to move in a single period of time, in which a unit potential well is maintained, transfer is effected as if six-phase drive, as distinguished from conventional two-phase drive, were used. The resulting signal transfer rate is three times as high as the usual signal transfer rate.

More specifically, paying attention to the positional relation between signal charges horizontally transferred, six packets are handled as a unit, which is three times as great as two packets conventionally dealt with as a unit during actual pickup, even if the six-electrode structure is formed. Stated another way, the transfer electrode structure deals with electrodes three times as great in number as the conventional electrode structure when a signal charge is present. The timing signal generator 22*a* generates horizontal transfer timing signals that allow a signal charge to move over the above three times greater number of packets or electrodes while maintaining the original drive phase. Because the horizontal transfer path HR has a six-electrode structure and because two-phase drive is used, a timing that provides each three packets (one-half of six packets) with the same phase is desirable. This configuration will be described more specifically later.

Basically, the timing signal generator 22a generates the timing signals 22d and timing signals 22e under the control of the system controller 18 in accordance with pickup modes selected by the operator. The timing signals 22d and 22e are respectively delivered to the driver 22b and various sections of the camera 10, as shown in FIG. 1. The driver 22b superposes the various timing signals to thereby generate drive signals 22c. The drive signals 22c are fed not only to the zoom control mechanism and AF control mechanism included in the lens system 12, but also to the diaphragm control 24 and image pickup device 30. The driver 22b may also be directly controlled by the system controller 18. Alternatively, the controller 18 may inhibit the driver 22b from superposing the field shift gate pulses on the drive signal 22c to be applied to the columns whose signal charges should not be read out.

The diaphragm control mechanism 24 controls the sectional area of an incident beam, i.e., a lens opening such that an optimal beam is incident to the image pickup device 30. The driver 22b feeds the drive signal 22c to the diaphragm control mechanism 24 also. The drive signal 22c causes the mechanism 24 to operate under the control of the system controller 18. The system controller 18 calculates a lens opening and an exposure time on the ba sis of signal charges output from the image pickup device 30 (AE processing), although not shown specifically. Control signals 18a representative of the calculated lens opening and exposure time are input to the timing signal generator 22a. In response, the timing signal generator 22a feeds the timing signal 22d to the driver 22b and causes it to deliver the corresponding drive signal 22c to the diaphragm control mechanism 24.

The image pickup device 30 has the previously mentioned photodiodes, or photosensitive cells, arranged in a plane perpendicular to the optical axis of the lens system 12. The optical low-pass filter 26 and color filter 28 are integrally arranged in front of the photodiodes in the direction of light incidence. The low-pass filter 26 limits the spatial frequency of an optical image to below the Nyquist frequency. The color filter 28 has filter segments corresponding one-to-one to the photodiodes and effects color separation. In the illustrative embodiment, the color filter 28 is implemented by a single plate. The kind and arrangement of the color filter 28 will be described specifically later.

The image pickup device 30 may be implemented by a CCD (Charge Coupled Device) image sensor or a MOS (Metal Oxide Semiconductor) image sensor by way of example. The image pickup device 30 reads out signal charges generated by the photodiodes in a particular manner in each of the preliminary pickup mode and actual pickup mode. Particularly, in the preliminary pickup mode, the signal charges of each preselected number of pixels are mixed together as a un it. The signal charges are fed from the image pickup device 30 to the preprocessing circuit 32.

In the illustrative embodiment, the color filter 28 has a so-called honeycomb arrangement and has G filter segments arranged in a square lattice pattern and R and B filter segments arranged in a full-checker pattern. Let this filter arrangement be referred to as a G square (lattice), RB full-checker pattern (see FIG. 2). Signal charges are mixed and read-out by the simultaneous two-line reading scheme with consideration given to the above pattern of the color filter 28.

The preprocessing circuit 32 includes a CDS (Correlated Double Sampling) section not shown. In the case where the image pickup device 30 is implemented by a CCD image sensor, the CDS section includes a clamp circuit and a sample and hold circuit. The clamp circuit clamps various kinds of noise ascribable to the image sensor in synchronism with a timing signal 22e output from the timing signal generator 22a. The sample and hold circuit samples and holds the signal charges in synchronism with the timing signal 22e. The CDS section delivers the resulting noise-free signals 32a to the ADC 34.

The ADC 34 quantizes the signal levels of the analog signals, or signal charges, 32a by use of a preselected quantizing level and thereby converts them to digital signals 34a. The ADC 34 delivers the digital signals 34a to the signal processor 36 in synchronism with the conversion timing clock or similar timing signal 22e output from the timing signal generator 22a.

Figure 3:
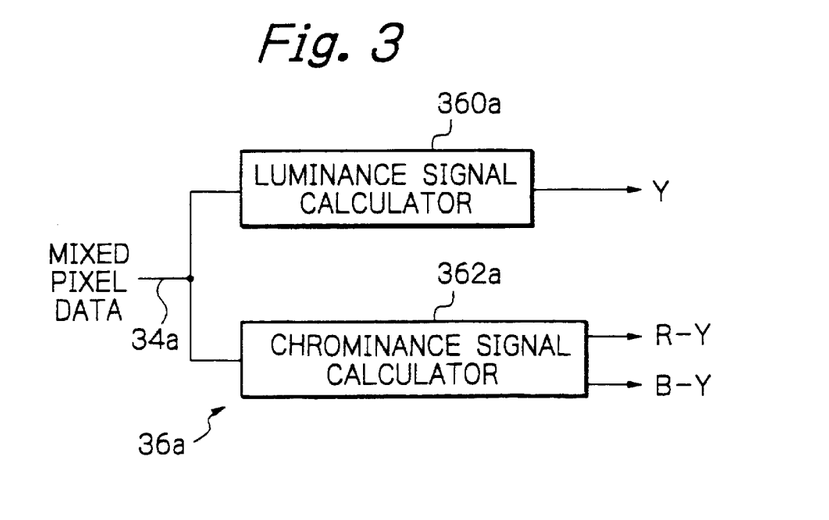
FIG. 3 is a schematic block diagram showing a specific configuration of a preliminary pickup processing circuit included in the illustrative embodiment.

The signal processor 36 is made up of a preliminary pickup processing circuit 36a and an actual pickup processing circuit 36b. In the preliminary pickup mode, the digital signals 34a, i.e., digital mixed pixel data derived from the mixed signal charges are input to the preliminary pickup processing circuit 36a. FIG. 3 shows a specific configuration of the preliminary pickup processing circuit 36a. As shown, the preliminary pickup processing circuit 36a has a luminance signal calculator 360a and a chrominance signal calculator 362a. The luminance signal calculator 360a adds a plurality of (e.g. three) consecutive mixed pixel data and then adds the next plurality of consecutive mixed data, which are the last one of the previous mixed pixel data and mixed pixel data following it. The chromirance signal calculator 362a produces differences between the adjoining mixed pixel data, multiplies the differences by four different coefficients, and then outputs differences between the resulting products as chrominance signals (R–Y) and (B–Y). The operation of the luminance signal calculator 360a and that of the chrominance signal calculator 362a will be described in detail later with reference to FIG. 5. The preliminary pickup processing circuit 36a executes direct matrix processing by calculation.

The actual pickup processing circuit 36b includes a gamma correcting section, a luminance data generator, a luminance data interpolator, a high resolution, plane interpolator and a chrominance matrix processing processor, although not shown specifically. With these sections, the signal processor 36 further enhances the quality of an image. The gamma correcting section includes a gamma correction circuit for color correction and an AWB (Automatic White Balance) circuit for automatic white balance control. The gamma correcting section uses lookup tables listing a plurality of sets of data, i.e., digital signals to be input to a ROM and correction data to be output in accordance with the digital signals. While the gamma correcting section may be included in circuitry following the signal processor 36, it should preferably be included in the signal processor 36 in order to minimize the number of look-up tables. Such data correction is also effected in synchronism with a timing signal output from the timing signal generator 22a. The gamma correcting section delivers the correction data to the luminance data generator.

The luminance data generator operates under the control of the system controller 18. For example, this section weights the correction data in consideration of the arrangement of colors to thereby generate luminance data Y for pixels where the photodiodes are positioned. The luminance data Y are fed to the luminance data interpolator. The luminance data interpolator interpolates luminance data in virtual pixels each intervening between nearby luminance data Y, thereby generating plane luminance data $Y_h$. The plane luminance data are delivered to the high resolution, plane interpolator.

The high resolution, plane interpolator generates R plane data, G plane data and B plane data on the basis of the plane luminance data $Y_h$ and corrected R, G and B pixel data input thereto. The R, G and B plane data are fed to the chrominance matrix processor. The plane interpolator includes memories for respectively storing the processed image data and allowing them to be read out in a nondestructive way. The plane interpolator calculates pixel data by reading the pixel data out of the memories.

The chrominance matrix processor transforms the R, G and B plane data to luminance data Y and chrominance data (R−Y) and (B−Y) capable of being displayed on the monitor 42. Specifically, the matrix processor multiplies each of the R, G and B plane data by a particular mixture ratio to thereby output the luminance data Y and chrominance data (R−Y) and (B−Y). To determine mixture ratios, use is made of conventional coefficients. A cutoff frequency containing the frequency bands of the luminance data Y and chrominance data (R−Y) and (B−Y) and not causing aliasing to occur is set in order to execute antialiasing processing. The luminance data Y are fed to an aperture adjusting circuit, not shown and have their high frequencies raised thereby. As a result, the contour of the image is enhanced. The chrominance matrix processor delivers the luminance data Y and chrominance data (R−Y) and (B−Y), or Cr and Cb, (37) to the compression/expansion circuit 38 while delivering them to the monitor 42 on the system bus 16.

As stated above, the signal processor 36 generates the luminance data Y and chrominance data Cr and Cb 36a by using, among the pixel data output from the photodiodes, the pixel data having close correlation by way of example.

The compression/expansion circuit 38 is made up of a circuit for compressing image data with the JPEG (Joint Photographic Experts Group) scheme using orthogonal transform, and a circuit for expanding the compressed image data. During recording, the compression/expansion circuit 38 delivers compressed data 38a to the record/reproduction circuit 40 on the system bus 16 under the control of the system controller 18. Alternatively, the compression/expansion circuit 38 may simply pass the data 37 output from the signal processor 36 therethrough and transfer them to the monitor 42 on the system bus 16 under the control of the system controller 18. During reproduction, the compression/expansion circuit 38 receives data 40a read out of the record/reproduction circuit 40 on the system bus 16 and expands them. The expanded data are also fed to the monitor 42 and displayed thereby.

The record/reproduction circuit 40 is made up of a recording section for writing image data in a recording medium and a reproducing section for reading image data out of the recording medium, although not shown specifically. The recording medium may be implemented by a so-called smart medium or similar semiconductor memory, a magnetic disk or an optical disk by way of example. When use is made of a magnetic disk or an optical disk, the record/reproduction circuit 40 includes a modulator for modulating image data and a head for writing the modulated image data in the disk.

The monitor 42 displays, under the control of the system controller 18, the luminance data and chrominance data or the R, G and B data 37 while taking account of its screen size and adjusting the timing. When the monitor 42 is implemented by a LCD (Liquid Crystal Display) and displays a moving picture, it displays, during preliminary pickup, an image reduced to, e.g., one-third in the number of photodiodes or pixels in the horizontal direction.

With the above-described configuration, the camera 10 adequately controls each of preliminary pickup and actual pickup in a particular manner despite that the image pickup device 30 has high pixel density. Specifically, during preliminary pickup, the camera 10 reads out signals at high speed in order to rapidly set up exposure conditions for actual pickup to follow. During actual pickup, the camera 10 reads out all of the pixels in order to enhance the quality of the entire picture.

Figure 2:
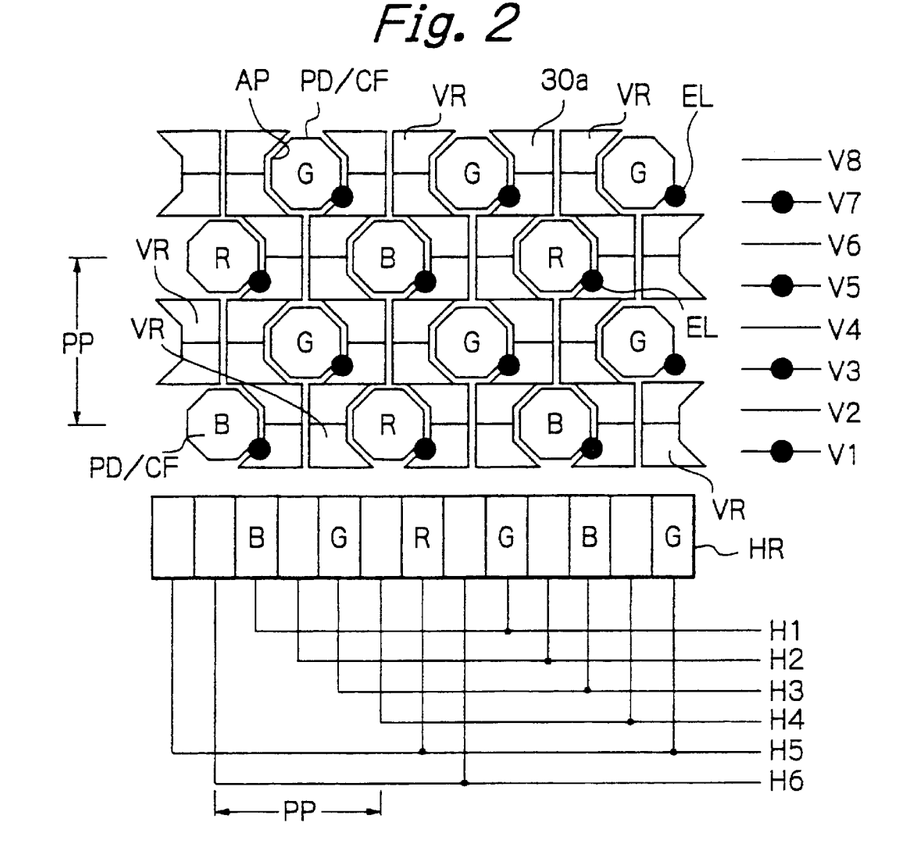
FIG. 2 is a schematic view showing the photosensitive array of an image pickup section included in the illustrative embodiment, as seen from the light incidence side, together with a relation between signal charges transferred in the horizontal direction and a relation between horizontal drive signals.

Reference will be made to FIG. 2 for describing the image pickup device 30 and color filter 28 specifically. FIG. 2 shows a positional relation between the photosensitive array of the image pickup device 30 and vertical transfer drive signals V1 through V8 output from the driver 22b. As shown, the image pickup device 30 includes photosensitive portions 30a in which photodiodes or photosensitive cells PD are arranged bidimensionally for photoelectrically transform incident light. Each photodiode PD is shifted from the adjoining photodiodes PD in the vertical and horizontal directions, as illustrated. The photosensitive portions 30a each are formed with an aperture AP in the front thereof. Signal charges are read out of the photodiodes PD via electrodes EL that are so arranged as to skirt round the apertures AP. The signals read out through the electrodes EL are transferred vertically along vertical transfer registers or vertical transfer paths VR. Subsequently, the signals are transferred horizontally, i.e., in the direction perpendicular to the vertical transfer registers VR along horizontal transfer registers or horizontal transfer path HR.

The vertical transfer registers VR transfer the signals in accordance with the vertical transfer drive signals V1 through V8. Specifically, four vertical transfer registers or electrodes VR are assigned to each photosensitive portion 30a. Each photosensitive portion 30a has two regions, or registers VR, adjoining each other in the horizontal direction, i.e., when the photodiodes PD shifted from each other are seen in the horizontal direction. The two adjoining regions refer to two packets. The horizontal transfer registers HR each have six electrodes as a unit in matching relation to the above arrangement of the vertical transfer registers VR (see FIG. 2).

In the illustrative embodiment, the apertures AP are formed in the image pickup device 30 in a honeycomb pattern, and each has an octagonal shape. While the apertures AP generally have a square lattice configuration, the crux is that the apertures AP be capable of enhancing sensitivity and providing the vertical transfer registers VR with the same width to thereby prevent transfer efficiency from decreasing. The apertures AP may therefore have a polygonal shape, a square lattice shape rotated by 45 degrees (e.g. rhombic) or even a hexagonal shape.

As also shown in FIG. 2, the color filter 28 has color filter segments CF each covering one of the apertures AP. The filter segments CF each are positioned just in front of a particular photodiode PD. Assume that the distance between nearby photodiodes PD is a pixel pitch PP. Then, the apertures AP are arranged in rows and columns that are shifted by the pixel pitch PP in each of the horizontal and vertical directions, as illustrated. When the apertures AP are polygonal, they may be more densely arranged in matching relation to the polygon. In such a case, apertures AP in rows and columns may be shifted from each other by one-half of the pixel pitch PP. For example, when the apertures AP are octagonal, as shown in FIG. 2, they may be shifted by one-half of the pixel pitch PP (|PPI|2) in both of the horizontal and vertical directions. In this manner, the dense arrangement of the apertures AP depends on the shape of each aperture AP.

How the camera 10 operates when the shutter release button is pressed to its half-stroke position assigned to preliminary pickup will be described hereinafter. This operation is unique to the illustrative embodiment. FIG. 2 shows the image pickup device 30 in a preliminary pickup condition wherein signals are read out at high speed. First, before the condition of FIG. 2 occurs, signal charges are read out of all of the photodiodes PD. For this purpose, the timing signal generator 22a included in the timing signal feeding section 22 applies field shift gate pulses only to the vertical drive signals V1, V3, V5 and V7. The drive signals V1, V3, V5 and V7 with the field shift gate pulses superposed thereon are fed to the electrodes EL, so that field shift gates associated with the electrodes EL are turned on. As a result, signal charges are read out of all of the photodiodes or pixels PD and output to the vertical transfer paths VR in the same manner as during actual pickup.

The driver 22b sends four-phase vertical drive signals to the vertical transfer paths VR in order to transfer the signal charges along the paths VR. FIG. 2 shows a condition wherein the signal charges have been transferred from the vertical transfer paths VR to the horizontal transfer path HR by two packets of the paths VR. Because each color filter segment CF is shifted vertically and horizontally from adjoining segments CF, the colors are prevented from being mixed together in spite of the simultaneous two-line read-out and can appear together on a single horizontal transfer path HR. For the horizontal transfer of the signal charges, horizontal drive signals H1 through H6 are sequentially fed to the packets of the horizontal transfer path HR.

By the simultaneous two-line read-out described above, the signal charges are positioned on the horizontal transfer path HR in a relation of "B,_,G,_R,-,G,_,B,_,G_,-, . . . ". It is to be noted that the symbol "-" is representative of a vacant packet where a signal charge is absent, and "-" is representative of an barrier which forms a potential wall. The horizontal transfer path HR has a six-electrode structure, as stated earlier.

Figure 4:
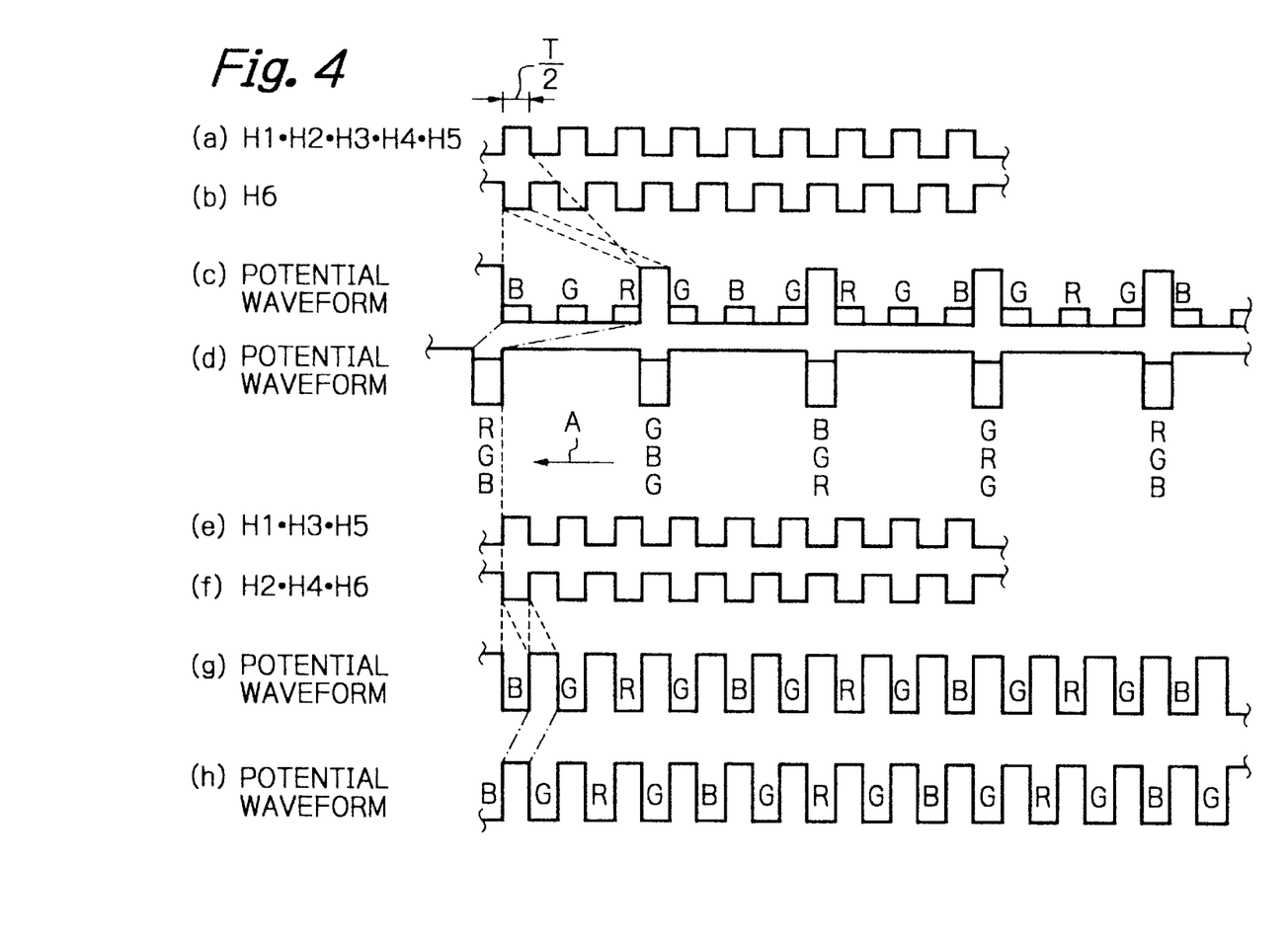
FIG. 4 is a timing chart comparing the image pickup section of the illustrative embodiment and a reference image pickup section with respect to a relation between the phases of horizontal drive signals fed to a horizontal transfer path and potential wells formed thereby.

As shown in FIG. 4, part (a), the horizontal drive signals H1 through H5 are provided with the same phase and constitute the previously mentioned first unit horizontal drive signal. As shown in FIG. 4, part (b), only the horizontal drive signal H6 is opposite in phase to the signals H1 through H5 and constitutes the previously mentioned second unit horizontal drive signal. As a result, as shown in FIG. 4, part (c), large potential wells each accommodating three signal charges without distinguishing the colors are formed in the horizontal transfer path HR. Therefore, each three signal charges are mixed together. At the same time, the horizontal drive signal H6 forms a barrier in each packet to which it is applied, separating each three consecutive signal charges from the other signal charges adjoining them.

As shown in FIG. 4, part (d), each potential well is rearranged into a single packet because the horizontal drive signals H1 through H5 and the horizontal drive signal H6 are opposite in phase to each other. Consequently, the mixed signal charges appear on the horizontal transfer path HR in a positional relation of "(BGR),-,-,-,-,-,-,(GBG),-,-,-,-,-, (RGB),-,-,-,-,-, (GRG),-,-,-,-,-, (BGR),-,-,-, . . . ". In this condition, the signal charges are present in every sixth packet. Thereafter, the previously mentioned third unit horizontal drive signal is fed to the horizontal transfer path HR for causing the signal charge of each packet to be transferred over six electrodes in a direction A in a single period.

The third unit horizontal drive signal may be implemented by the horizontal drive signals shown in FIG. 4, parts (a) and (b). Because six-phase drive usually transfers signal charges by one electrode (packet) in one-sixth of a single period, signal charges can be transferred by six electrodes (packets) in a single period. Therefore, two-phase drive originally effected, but at a rate equivalent to one available with six-phase drive, successfully triples the transfer rate without the reading frequency being varied. This kind of transfer is also achievable when he reading frequency is increased and combined with six-phase drive.

Another specific method of transferring the mixed signal charges available with the illustrative embodiment will be described hereinafter. After the potentials shown in FIG. 4, part (c), have been formed, the Liming signal generator 22a generates horizontal timing signals that cause the horizontal drive signals H4, H5 and H6 to go low, and feeds the horizontal timing signals to the driver 22b. Consequently, the six packets forming the potential well and associated barrier are divided into two. Subsequently, the horizontal drive signals H1, H2 and H3 are fed in opposite phase to the horizontal drive signals H4, H5 and H6. That is, the horizontal drive signals applied to each three consecutive packets are reversed in phase every T/2 second (half a period), so that the signal charges each are shifted over three packets in the direction A at a time.

As seated above, when the horizontal drive signals are sequentially fed to the horizontal transfer path HR, the potentials convey the signal charges every half period. It is therefore possible to read out the signal charges input to the horizontal transfer path HR at a tripled transfer rate simply by varying the timings of the horizontal drive signals while maintaining two-phase drive, i.e., without varying the reading frequency, as stated earlier.

For example, assume that the image pickup device 30 has 1,600 pixels in the horizontal direction and 1,200 pixels in the vertical direction, as prescribed by the UXGA (Ultra extended Graphics Array) standard that is the maximum size available with a display. Then, during preliminary pickup, signal charges are read out of only about 533 pixels, which is short of 640 pixels required of VGA (Video Graphics Array). However, considering the increasing demand for higher pixel density of the image pickup device 30, the high-speed reading with horizontal pixel reduction described above will surely contribute a great deal to future image pickup technologies. While the illustrative embodiment has concentrated on progressive scanning, i.e., the reading of signal charges out of all of the photodiodes PD, the signal charges may be reduced in the vertical direction as in conventional technologies in order to further promote rapid read-out. In such an alternative case, the vertical drive signals should preferably be sent to the same destination because they relate to colors to be processed in circuitry to follow.

The illustrative embodiment with the above construction is capable of reducing the pixels to at least one-third in the horizontal direction in the preliminary pickup mode. This makes it possible to reduce the signal reading time without varying the reading frequency.

For comparison, another arrangement for reading signal charges out of the image pickup will be described with reference to FIG. 4, parts (e) through (h). The arrangement includes an image pickup section identical with the image pickup device 30 of FIG. 2. As shown in FIG. 4, parts (e) and (f), the conventional image pickup section differs from the image pickup device 30 of FIG. 2 in that horizontal timing signals opposite in phase to each other are respectively applied to odd horizontal drive signals H1, H3 and H5 and even horizontal drive signals H2, H4 and H6. In response to the two different kinds of drive signals, potential wells and barriers are alternately formed in consecutive packets, as shown in FIG. 4, part (g). When the phase is advanced by one-half, signal charges each are transferred by one packet on the horizontal transfer path to a particular position shown in FIG. 4, part (h). The conventional image pickup therefore does not allow signal charges to be reduced in the horizontal direction when they are read out, i.e., the preliminary pickup mode and actual pickup mode are basically identical with each other. It has been general with the image pickup device to reduce pixels to, e.g., one-half or one-fourth in the vertical direction during preliminary pickup, thereby enhancing rapid read-out.

For horizontal pixel reduction to one-half, the field shift gate pulses generated by the timing signal generator 22a are superposed on the vertical drive timing signals so as to produce the vertical drive signals V1 and V3 or V5 and V7. To read signal charges out of the photodiodes PD, the driver 22b feeds the vertical drive signals V1, V3, V5 and V7 to transfer electrodes or field shift gates EL. As a result, signal charges are read out via the transfer electrodes EL while being reduced to one-half.

Assume that the primary colors R, G and B are required to appear together on the horizontal transfer path HR even during preliminary pickup. Then, the simultaneous two-line read-out is effected. When signal charges are simply read out line by line, only the colors R and B or the color G is read out line by line in the horizontal direction. That is, the colors R, G and B do not appear together on a single line, obstructing adequate interpolation at the signal processing stage. FIG. 2 shows the horizontal transfer path HR in a condition wherein two lines are read out at the same time. The horizontal drive signals H1 through H6 each are fed to particular packets of the horizontal transfer path HR. As shown in FIG. 2, the horizontal transfer path HR has a two-electrode structure and transfers the signal charges by using a single packet as a barrier.

As shown in FIG. 4, parts (g) and (h), the conventional arrangement performs two-phase drive in transferring signal charges on the horizontal transfer path HR. Specifically, the horizontal drive signals H1, H3 and H5 are fed in one phase while the horizontal drive signals H2, H4 and H6 are fed in the other phase. The horizontal drive signals H1, H3 and H5 generate potential wells, as shown in FIG. 4, part (g). Subsequently, the horizontal drive signals H2, H4 and H6 are fed and cause the potential wells to move by one packet, as shown in FIG. 4, part (h). Such a procedure is repeated to read two lines of signal charges as a single line. This kind of signal reading scheme, however, does not give consideration to pixel reduction in the horizontal direction and therefore needs, during preliminary pickup, a period of time three times longer than the period of time particular to the illustrative embodiment.

Assume that signal charges are read out of only the odd rows or even rows, and that only the color G is used for photometry although it is not applicable to a color LCD. Then, the pixels can be reduced only to one-half in the horizontal direction, so that the horizontal transfer rate is simply doubled.

During preliminary pickup, a long reading time ascribable to priority given to image quality is not desirable from the operation standpoint. For example, if the preliminary pickup is slow, then the operator cannot set up pickup conditions at a desired timing before actual pickup and must, in the worst case, simply wait without any shot.

While the illustrative embodiment with the above-described procedure realizes more rapid signal read-out than the other image pickup apparatuses, the signal charges are mixed together when read out. Such signal charges are subjected to noise cancellation and other processing at the preprocessing circuit 32 and then transformed to mixed pixel data by the ADC 34. It is, however, likely that the image data cannot produce an attractive picture due to color mixture when displayed on the monitor 42.

Figure 5:
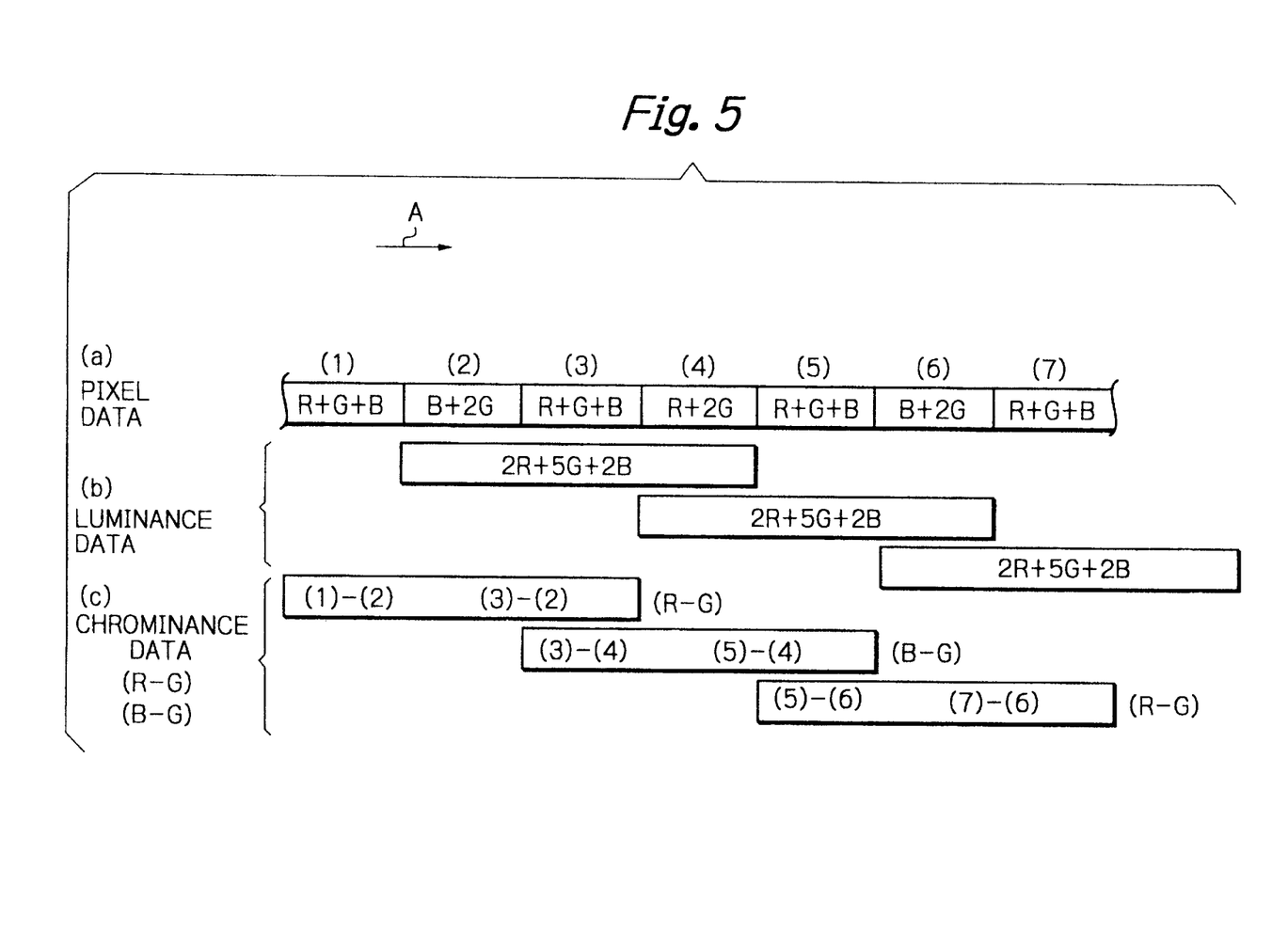
FIG. 5 is a timing chart demonstrating how the preliminary pickup processing circuit of the illustrative embodiment directly calculates luminance data and chrominance data.

In light of the above, in the preliminary pickup mode, the illustrative embodiment feeds the mixed pixel data to the preliminary pickup processing circuit 36a, which has been enabled by the system controller 18. Specifically, as shown in FIG. 5, part (a), pixel data mixed in successive packets are sequentially input to the preliminary pickup processing in the direction A. FIG. 5, part (a), shows parenthesized packets (1) through (7) each including particular mixed pixel data. In the illustrative embodiment, the luminance signal calculator 360a, FIG. 3, produces luminance data by adding the pixel data of three successive packets (2), (3) and (4)

$$(2) + (3) + (4) = (B + 2G) + (R + B + G) + (R + 2G) \qquad \text{Eq. (1)}$$
$$= 2R + 5G + 2B$$

Likewise, the luminance signal calculator 360a produces the next luminance data by adding the pixel data of the above packet (4) and those of two packets (5) and (6) following the packet (4). In the same manner, the calculator 360a produces another luminance data by adding the pixel data of the packet (6) and those of two packets (7) and (8) following the packet (6). That is, the calculator 360a uses the last one of three consecutive packets, from which luminance data has been calculated, as the first packet of the next three consecutive packets. Consequently, as shown in FIG. 5, part (b), the resulting consecutive luminance data overlap each other over a single packet without exception. The luminance data (2R+5G+2B) produced by the Eq. (1) is represented by 2(R+B+G)+3G. The coefficients by which the primary colors R, G and B should be multiplied may be implemented by the sensitivity ratios between the color filter segments CF, FIG. 2. The chrominance signal calculator 362a, FIG. 3, produces chrominance data by calculation. The mixed pixel data input to the luminance signal calculator 360a are input to the chrominance signal calculator 362a also. The calculator 362a produces chrominance data (R−G) and (B−G) by using differences between consecutive packets. Specifically, the differences (R−G) are expressed as:

$$(R-G)_{12} = (1) - (2) \qquad \text{Eq. (2a)}$$
$$(R-G)_{32} = (3) - (2) \qquad \text{Eq. (2b)}$$

where the suffixes are representative of packets used. In this manner, the calculator 362a produces the differences (R−G) by subtracting the second one of three consecutive packets from each of the first and third ones of the same packets.

Subsequently, the chrominance calculator 362a produces differences (B−G) by subtracting the second one of three consecutive packets, which are the third packet used to produce (R−G) and two packets following it, from each of the first and third ones of the same packets:

$$(B-G)_{34}=(3)-(4) \qquad \text{Eq. (3a)}$$

$$(B-G)_{54}=(5)-(4) \qquad \text{Eq. (3b)}$$

The differences produced by the above calculations are then multiplied by preselected coefficients. Differences between the resulting products are used to calculate chrominance data (R−Y) and (B−Y):

$$R-Y=0.7(R-G)_{12}-0.11(B-G)_{34} \qquad \text{Eq. (4a)}$$

$$B-Y=0.89(B-G)_{34}-0.30(R-G)_{12} \qquad \text{Eq. (4b)}$$

As stated above, the signal charges are mixed together in the horizontal direction and read out at high speed by being reduced in the same direction. Such signal charges are converted to pixel data and directly input to the signal processor 36. The signal processor 36 outputs approximate luminance data and chrominance data substantially directly calculated on the basis of the pixel data and delivers them to the monitor 42. The luminance data and chrominance data produce a picture of higher quality on the monitor 42 than the mixed pixel data.

Figure 6:
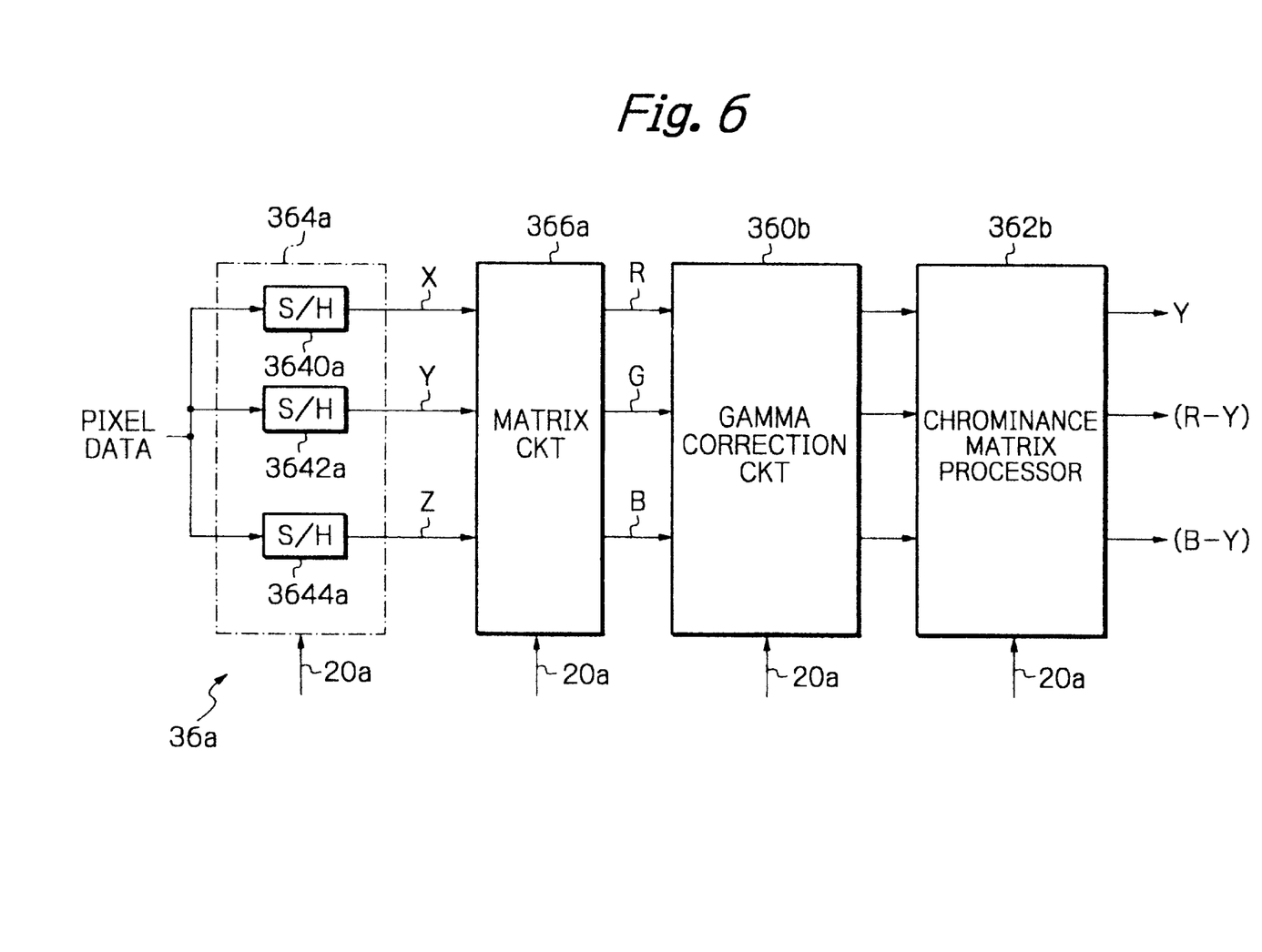
FIG. 6 is a schematic block diagram showing another specific configuration of the preliminary pickup processing circuit of the illustrative embodiment.

Referring to FIG. 6, another specific configuration of the preliminary pickup processing circuit 36a will be described. Briefly, the preliminary pickup processing circuit 36a shown in FIG. 6 is constructed to accurately produce the primary colors R, G and B, so that a picture of high quality can be displayed even when the mixed pixel data are used. As shown, the preliminary pickup processing circuit 36a is made up of a sample and hold section 364a, a matrix circuit 366a, a gamma correction circuit 360b, and a chrominance matrix processor 362b. The mixed pixel data are input to the sample and hold section 364a in the relation shown in FIG. 5, part (a).

The gamma correction circuit 360b and chrominance matrix processor 362b respectively constitute the gamma correcting section and chrominance matrix section of the previously stated actual pickup processing circuit 36b as well, thereby simplifying the overall circuitry. Switches or selectors, not shown, are connected between the matrix circuit 366a and the gamma correction circuit 360b and between the gamma correction circuit 360b and the chrominance matrix processor 362b in order to switch the destination of the pixel data between preliminary pickup and actual pickup. The system controller 18 controls the preliminary pickup processing circuit 36a including the above switches.

The sample and hold section 364a includes sample and hold (S/H) circuits 3640a, 3642a and 3644a for sampling and holding three consecutive packets at a time. The sample and hold section 364a first samples, e.g., the packet (1) shown in FIG. 5, part (a). The signal generator 20 provides the same and hold section 364a with a sampling timing. The S/H circuits 3640a through 3644a respectively sample and hold the third, first and second ones of three successive packets of pixel data. The pixel data sampled and held by the S/H circuits 3640a through 3644a will be respectively represented by three stimulus values or variables X, Y and Z hereinafter. The sample and hold section 364a feeds the three consecutive packets of image data to the matrix circuit 366a at a time.

The matrix circuit 366a has an RGB matrix processing function, i.e., produces the primary colors R, G and B on the basis of the three stimulus values X, Y and Z. For this purpose, the matrix circuit 366a uses equations that will be described later. The resulting R, G and B data are input to the gamma correction circuit 360b. The gamma correction circuit 360b corrects the input R, G and B data with data listed in, e.g., the previously stated lookup tables and delivers the corrected R, G and B data to the chrominance matrix processor 362b.

The chrominance matrix processor 362b includes a circuit or a calculating section for generating luminance data Y and chrominance data (R−Y) and (B−Y) on the basis of the corrected R, G and B data. The signals 20a output from the signal generator 20 are delivered to the matrix circuit 366a, gamma correction circuit 360b, and chrominance matrix processor 362b, causing each of them to operate at a particular timing under the control of the system controller 18.

Assume that even after the processing of the gamma correction circuit 360b, the actual pickup processing circuit 36b continuously produces the high-frequency luminance signal $Y_H$ from the R, G and B data directly input thereto. Then, luminance data Y output from the chrominance matrix processor 362b may be used as a low-frequency luminance signal $Y_L$ and combined with the high-frequency luminance signals $Y_H$ in order to output a luminance signal Y having an extended frequency band, although not shown specifically.

With the above configuration, the preliminary pickup processing circuit 36a is capable of accurately reproducing R, G and B data from the mixed pixel data and generating image data (luminance and chrominance) by using the R, G and B data. The image data are fed from the processing circuit 36a to the monitor 42.

The operation of the preliminary pickup processing circuit 36a will be briefly described hereinafter. The sample and hold section 364a samples and holds three consecutive packets at a time. The mixed pixel data sampled and held and the three stimulus values X, Y and Z have the following relations:

$$X=R+2G \qquad \text{Eq. (5a)}$$

$$Y=R+G+B \qquad \text{Eq. (5b)}$$

$$Z=B+2G \qquad \text{Eq. (5c)}$$

On receiving the stimulus values X, Y and Z, the matrix circuit 366a produces the primary colors R, G and B by use of the following equations:

$$R=(X+2Y-2Z)/3 \qquad \text{Eq. (6a)}$$

$$G=(X+Z-Y)/3 \qquad \text{Eq. (6b)}$$

$$B=(Z+2Y-2X)/3 \qquad \text{Eq. (6c)}$$

The gamma correction circuit 360b executes correction with the primary colors R, G and B fed thereto from the matrix circuit 366a. The chrominance matrix processor 362b executes matrix processing with the corrected R, G and B data by using coefficients customarily applied to R, G and B data and thereby easily generates luminance data Y and chrominance data (R−Y) and (B−Y).

By the above-described procedure, signal charges are read out while being mixed and thereby reduced in the horizontal direction and can therefore be read out in a short period of time. At the same time, image quality is free from degradation ascribable to such rapid signal read-out because luminance data Y and chrominance data (R−Y) and (B−Y) are produced from the R, G and B data of three signal charges derived from the mixed pixel data.

While the illustrative embodiment uses a color filter having a G square, RB full-checker pattern, the crux is that the filter segments of the color filter implement the previously stated color pattern repeatedly appearing on the horizontal transfer path HR. For example, the G square, RB full-checker pattern may be replaced with a stripe pattern having colors appearing in the order of R, G, B, G, R, B, G and so forth or even a stripe pattern of complementary colors.

As stated above, in the illustrative embodiment, the digital still camera 10 with a so-called honeycomb arrangement reads signal charges out of the image pickup device 30 in the preliminary pickup mode in the same manner as in the actual pickup mode and transfers them along the vertical transfer paths VR. As a result, mixed signal charges are output without regard to their colors. This is successful to promote rapid signal read-out. Specifically, in the case of a G square, RB full-checker pattern, the horizontal drive signals are fed such that when the signal charges are transferred along the horizontal transfer path HR, each three packets form the same potential (well). The signal charges can therefore be read out by two-phase drive even if they are formed by six-electrode structure, without the reading frequency being varied. This triples the horizontal transfer rate and therefore prevents the operator from, e.g., missing a shutter chance at the time of actual pickup despite that the image pickup device 30 has high pixel density.

To prevent the pixel data mixed in color from degrading image quality, the illustrative embodiment reproduces accurate signals by approximation or within a preselected range. A moving picture can therefore be displayed on the monitor 42 with high quality. This is also successful to achieve the above-described advantage.

In summary, a solid-state image pickup apparatus and a signal reading method of the present invention mix, during preliminary pickup, signal charges output in accordance with signals fed from a signal feeding section. The signal charges are output from a horizontal transfer path as if they were reduced in the horizontal direction, so that the substantial transfer rate is increased. Specifically, pixel data produced in accordance with horizontal drive signals, which are output from the signal feeding section and adjusted in timing, while being reduced in the horizontal direction are read out at the same frequency. As a result, the pixel output rate is at least tripled. This prevents the operator from, e.g., missing a shutter chance at the time of actual pickup despite that an image pickup section has high pixel density.

An image signal generating section performs calculations with digital data derived from the mixed signal charges so as to produce representative primary colors R, G and B of a plurality of signal charges by approximation or within a preselected range in the horizontal direction. A luminance signal and chrominance signals are then produced from the above colors R, G and B. Consequently, a short signal reading time and the improvement in color both are realized by the accurate reproduction of signals. A picture of high quality can therefore be displayed despite that the signal charges are mixed in color.

The entire disclosure of Japanese patent application No. 257139/1999 filed Sep. 10, 1999 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:

an image pickup section;

a signal processing section for executing digital signal processing; and a signal feeding section;

said image pickup section comprising:

photosensitive cells arranged bidimensionally and each being shifted from adjoining photosensitive cells in a horizontal and a vertical direction for photoelectrically transducing incident light;

a color filter having color filter segments each positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each positioned between a particular photosensitive cell and a vertical transfer path adjoining said particular photosensitive cell;

said signal feeding section feeding transfer timing signals to said transfer electrodes for causing the signal charges to be delivered from said photosensitive cells to said vertical transfer paths, feeding vertical drive signals to said vertical transfer paths for causing said signals charges to be transferred along said vertical transfer paths to said horizontal transfer path, and feeding the horizontal drive signals to said horizontal transfer path for causing said signal charges to be transferred along said horizontal transfer path, wherein said signal feeding section causes said signal charges to be transferred in a particular manner in each of an actual pickup mode, in which said signal charges are read out of substantially all of said photosensitive cells, and a preliminary pickup mode preceding said actual pickup mode;

the signal charges being transferred in the preliminary pickup mode, along said horizontal transfer path in response to the horizontal drive signals to cause the signal charges generated by the photosensitive cells to be mixed with each other in terms of every set of colors different from and adjacent to each other of said color filter segments in the horizontal direction;

wherein said signal processing section comprises an image signal generating circuit assigned to the preliminary pickup mode for performing calculations with the signal charges mixed in said horizontal transfer path to thereby generate a luminance signal and chrominance signals.

2. A solid-state image pickup apparatus comprising:

an image pickup section a signal processing section for executing digital signal processing; and a signal feeding section, said image pickup section comprising:

photosensitive cells arranged bidimensionally and each being shifted from adjoining photosensitive cells in a horizontal and a vertical direction for photoelectrically transducing incident light;

a color filter having color filter segments each positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each positioned between a particular photosensitive cell and a vertical transfer path adjoining said particular photosensitive cell, said signal feeding section feeding transfer timing signals to said transfer electrodes for causing the signal charges to be delivered from said photosensitive cells to said vertical transfer paths, feeding vertical drive signals to said vertical transfer paths for causing said signals charges to be transferred along said vertical transfer paths to said horizontal transfer path, and feeding the horizontal drive signals to said horizontal transfer path for causing said signal charges to be transferred along said horizontal transfer path, wherein said signal feeding section causes said signal charges to be transferred in a particular manner in each of an actual pickup mode, in which said signal charges are read out of substantially all of said photosensitive cells, and a preliminary pickup mode preceding said actual pickup mode;

wherein said signal processing section comprises an image signal generating circuit assigned to the preliminary pickup mode for performing calculations with the signal charges read out in a mixture to thereby generate a luminance signal and chrominance signals; and wherein when said color filter comprises a primary color filter, said primary color filter has a G (green) square lattice, RB (red and blue) full-checker pattern in which G filter segments are arranged in a square lattice pattern while R filter segments and B filter segments are alternately arranged at positions surrounded by nearby ones of said G filter segments, and wherein the filter segments diagonally opposite to each other with respect to each of said G filter segments are of a same color.

3. A solid-state image pickup apparatus comprising;

an image pickup section;

a signal processing section for executing digital signal processing; and a signal feeding section;

said image pickup section comprising:

photosensitive cells arranged bidimensionally and each being shifted from adjoining photosensitive cells in a horizontal and a vertical direction for photoelectrically transducing incident light;

a color filter having color filter segments each positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each positioned between a particular photosensitive cell and a vertical transfer path adjoining said particular photosensitive cell;

said signal feeding section feeding transfer timing signals to said transfer electrodes for causing the signal charges to be delivered from said photosensitive cells to said vertical transfer paths, feeding vertical drive signals to said vertical transfer paths for causing said signals charges to be transferred along said vertical transfer paths to said horizontal transfer path, and feeding the horizontal drive signals to said horizontal transfer path for causing said signal charges to be transferred along said horizontal transfer path, wherein said signal feeding section causes said signal charges to be transferred in a particular manner in each of an actual pickup mode, in which said signal charges are read out of substantially all of said photosensitive cells, and a preliminary pickup mode preceding said actual pickup mode;

wherein said signal processing section comprises an image signal generating circuit assigned to the preliminary pickup, mode for performing calculations with the signal charges read out in a mixture to thereby generate a luminance signal and chrominance signals; and wherein in the preliminary pickup mode n of successive packets formed on said horizontal transfer path operate as a horizontal drive unit, and wherein said signal feeding section generates horizontal drive timing signals, which are to be fed to successive packets of said horizontal drive unit, such that n–1 successive packets and remaining one packet of said horizontal drive unit form a potential well for storing the signal charges in adjoining positions and such that said remaining one packet is transferred by drive corresponding to six-phase drive.

4. An apparatus in accordance with claim 3, wherein said signal feeding section generates:

a first unit horizontal drive signal for causing the n–1 packets to form the potential well and causing the one remaining packet to form a barrier;

a second unit horizontal drive signal for causing packets identical in number as the signal charges stored in the n–1 packets to form a continuous potential well; and a third unit horizontal drive signal for causing the packets of the horizontal drive unit to be driven by two-phase drive;

wherein said first unit horizontal drive signal, said second unit horizontal drive signal and said third unit horizontal drive signal are sequentially output in this order.

5. A solid-state image pickup apparatus comprising:

an image pickup section;

a signal processing section for executing digital signal processing; and a signal feeding section;

said image pickup section comprising:

photosensitive cells arranged bidimensionally and each being shifted from adjoining photosensitive cells in a horizontal and a vertical direction for photoelectrically transducing incident light;

a color filter having color filter segments each positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each positioned between a particular photosensitive cell and a vertical transfer path adjoining said particular photosensitive cell;

said signal feeding section feeding transfer timing signals to said transfer electrodes for causing the signal charges to be delivered from said photosensitive cells to said vertical transfer paths, feeding vertical drive signals to said vertical transfer paths for causing said signals charges to be transferred along said vertical transfer paths to said horizontal transfer path, and feeding the horizontal drive signals to said horizontal transfer path for causing said signal charges to be transferred along said horizontal transfer path, wherein said signal feeding section causes said signal charges to be transferred in a particular manner in each of an actual pickup mode, in which said signal charges are read out of substantially all of said photosensitive cells, and a preliminary pickup mode preceding said actual pickup mode:

wherein said signal processing section comprises an image signal generating circuit assigned to the preliminary pickup mode for performing calculations with the signal charges read out in a mixture to thereby generate a luminance signal and chrominance signals;

said image signal generating section comprises:

a first function block for adding, among digital mixed signals derived from the signal charges and sequentially input to said image signal generating section, a plurality of successive mixed signals at a time to thereby generate a luminance signal represented by three primary colors R, G and B; and a second function block for producing a first component signal representative of a difference between, among the mixed signals, a subject mixed signal and a mixed signal immediately preceding said subject mixed signal, producing a second component signal representative of a difference between said subject mixed signal and a mixed signal immediately following said subject mixed signal, multiplying each of said first component and said second component by two predetermined kinds of coefficients, and generating two chrominance signals based on differences between resulting products.

6. An apparatus in accordance with claims 5, wherein said image signal generating section generates the luminance signals by multiplying the mixed signals to be added by coefficients comprising sensitivity ratios between the color filter segments.

7. An apparatus in accordance with claim 5, wherein said image signal generating section generates three mixed signals as the plurality of mixed signals, and wherein said image signal generating section starts sampling the mixed signals at a position shifted from a previous unit by a distance corresponding to two units.

8. A solid-state image pickup apparatus comprising:

an image pickup section, a signal processing section for executing digital signal processing; and a signal feeding section;

said image pickup section comprising:

photosensitive cells arranged bidimensionally and each being shifted from adjoining photosensitive cells in a horizontal and a vertical direction for photoelectrically transducing incident light;

a color filter having color filter segments each positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each positioned between a particular photosensitive cell and a vertical transfer path adjoining said particular photosensitive cell;

said signal feeding section feeding transfer timing signals to said transfer electrodes for causing the signal charges to be delivered from said photosensitive cells to said vertical transfer paths, feeding vertical drive signals to said vertical transfer paths for causing said signals charges to be transferred along said vertical transfer paths to said horizontal transfer path, and feeding the horizontal drive signals to said horizontal transfer path for causing said signal charges to be transferred along said horizontal transfer path, wherein said signal feeding section causes said signal charges to be transferred in a particular manner in each of an actual pickup mode, in which said signal charges are read out of substantially all of said photosensitive cells, and a preliminary pickup mode preceding said actual pickup mode;

wherein said signal processing section comprises an image signal generating circuit assigned to the preliminary pickup mode for performing calculations with the signal charges read out in a mixture to thereby generate a luminance signal and chrominance signals; and wherein said image signal generating section comprises:

a sample and hold circuit for sampling and holding, among digital mixed signals derived from the signal charges and sequentially input to said image signal generating section, a plurality of successive mixed signals appearing after a subject point at a time;

a matrix circuit for multiplying each of the mixed signals sampled and held by said sample and hold circuit by a particular coefficient, totaling resulting products, and producing a mean of a resulting sum to thereby generate the primary colors R, G and B;

a correcting circuit for executing gamma correction with the primary colors R, G and B output from said matrix circuit; and a chrominance matrix circuit for generating the luminance signal and the chrominance signals by using corrected primary colors R, G and B output from said correcting circuit.

9. A signal reading method comprising the steps of;

(a) preparing an image pickup section comprising:

photosensitive cells arranged bidimensionally and each being shifted from adjoining photosensitive cells in a horizontal and a vertical direction for photoelectrically transducing incident light;

a color filter having color filter segments each being positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each being positioned between a particular photosensitive cell and a vertical transfer path adjoining said particular photosensitive cell;

(b) feeding transfer timing signals for rendering said transfer electrodes conductive to thereby transfer the signal charges from said photosensitive cells to said vertical transfer paths, feeding vertical drive signals to said vertical transfer paths for transferring said signal charges along said vertical transfer paths to said horizontal transfer path, and feeding horizontal drive signals to said horizontal transfer path to transfer, in a preliminary pickup mode preceding an actual pickup mode in which signal charges are read out from substantially all of the photosensitive cells, the signal charges along the horizontal transfer path to cause the signal charges generated by the photosensitive cells to be mixed with each other in terms of every set of colors different from and adjacent to each other of said color filter segments in the horizontal direction to thereby output mixed signals; and (c) transferring said mixed signals along said horizontal transfer path with a timing for improving a horizontal drive rate being adjusted, whereby the signal charges are read out of said photosensitive cells as signals in the preliminary pickup mode.

10. A signal reading method comprising the steps of:

(a) preparing an image pickup section comprising:

photosensitive cells arranged bidimensionally and each being shifted from adjoining photosensitive cells in a horizontal and a vertical direction for photoelectrically transducing incident light;

a color filter having color filter segments each being positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each being positioned between a particular photosensitive cell and a vertical transfer path adjoining said particular photosensitive cell;

(b) feeding transfer timing signals for rendering said transfer electrodes conductive to thereby transfer the signal charges from said photosensitive cells to said vertical transfer paths, feeding vertical drive signals to said vertical transfer paths for transferring said signal charges along said vertical transfer paths to said horizontal transfer path and feeding horizontal drive signals to said horizontal transfer path for mixing some of said signal charges to thereby output mixed signals: and (c) transferring said mixed signals along said horizontal transfer path with a timing for improving a horizontal drive rate being adjusted, whereby the signal charges are read out of said photosensitive cells as signals in a preliminary pickup mode preceding an actual pickup mode in which signal charges are read out of substantially all of said photosensitive cells;

wherein when said color filter comprises a primary color filter, said primary color filter has a G square lattice, RB full-checker pattern in which G filter segments are arranged in a square lattice pattern while R filter segments and B filter segments are alternately arranged at positions surrounded by nearby ones of said G filter segments, and wherein the filter segments diagonally opposite to each other with respect to each of said G filter segments are of a same color.

11. A signal reading method comprising the steps of;

(a) preparing an image pickup section comprising:

photosensitive cells arranged bidimensionally and each being shifted from adjoining photosensitive cells in a horizontal and a vertical direction for photoelectrically transducing incident light;

a color filter having color filter segments each being positioned in front of a particular photosensitive cell in a direction of light incidence for separating colors of incident light representative of a scene;

vertical transfer paths for transferring signal charges, which are read out of said photosensitive cells in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each being positioned between a particular photosensitive cell and a vertical transfer path adjoining said particular photosensitive cell;

(b) feeding transfer timing signals for rendering said transfer electrodes conductive to thereby transfer the signal charges from said photosensitive cells to said vertical transfer paths, feeding vertical drive signals to said vertical transfer paths for transferring said signal charges along said vertical transfer paths to said horizontal transfer path and feeding horizontal drive signals to said horizontal transfer path for mixing some of said signal charges to thereby output mixed signals; and (c) transferring said mixed signals along said horizontal transfer path with a timing for improving a horizontal drive rate being adjusted, whereby the signal charges are read out of said photosensitive cells as signals in a preliminary pickup mode preceding an actual pickup mode in which signal charges are read out of substantially all of said photosensitive cells:

wherein said step (c) comprises the step (d) of feeding, in the preliminary pickup mode, horizontal timing signals for causing n of successive packets formed on said horizontal transfer path to operate as a horizontal drive unit to said successive packets, and wherein said horizontal timing signals cause n−1 successive packets and remaining one packet of said horizontal drive unit to form a potential well for storing the signal charges in adjoining positions and cause said remaining one packet to be transferred by drive corresponding to six-phase drive.

12. A method in accordance with claim 11, wherein said step (c) comprises the steps of:

(e) feeding a first unit horizontal drive signal for causing the n−1 packets to form the potential well and causing the one remaining packet to form a barrier;

(f) feeding a second unit horizontal drive signal for causing packets identical in number as the signal charges stored in the n−1 packets to form a continuous potential well; and (g) feeding a third unit horizontal drive signal for causing the packets of the horizontal drive unit to be driven by two-phase drive.

13. A signal reading method comprising the steps of:

(a) preparing an image pickup section comprising:

photosensitive cells arranged bidimensionally and each being shifted from adjoining photosensitive cells in a horizontal and a vertical direction for photoelectrically transducing incident light;

a color filter having color filter segments each being positioned in front of a particular photosensitive cell in a direction of light incidence for separating colors of incident light representative of a scene;

vertical transfer paths for transferring signal charges, which are read out of said photosensitive cells, in a vertical direction corresponding to a direction of columns of a bidimensional arrangement of said photosensitive cells;

a horizontal transfer path extending in a direction substantially perpendicular to said vertical transfer paths for transferring the signal charges input thereto from said vertical transfer paths in accordance with horizontal drive signals; and transfer electrodes each being positioned between a particular photosensitive cell and a vertical transfer path adjoining said particular photosensitive cell;

(b) feeding, when said color filter comprises a G square lattice, RB full-checker pattern, transfer timing signals for rendering said transfer electrodes conductive to thereby transfer the signal charges from said photosensitive cells to said vertical transfer paths, feeding vertical drive signals to said vertical transfer paths for transferring said signal charges along said vertical transfer paths to said horizontal transfer path, feeding horizontal drive signals to said horizontal transfer path for reading out said signal charges having been mixed during horizontal transfer along said horizontal transfer path while adjusting a timing for mixing some of said signal charges, and digitizing resulting mixed signal charges to thereby output pixel data; and (c) generating, based on the pixel data, a luminance signal and chrominance signals representative of a scene being picked up in a preliminary pickup mode preceding an actual pickup mode in which signal charges are read out of substantially all of said photosensitive cells.

14. A method in accordance with claim 13, wherein said step (c) comprises the steps of:

(d) adding a plurality of successive pixel data at a time to thereby generate a luminance signal represented by three primary colors R, G and B; and (e) producing first difference data representative of a difference between, among the pixel data, subject pixel data and pixel data immediately preceding said subject pixel data, producing second difference data representative of a difference between said subject pixel data and pixel data immediately following said subject pixel data, multiplying each of said first difference data and said second difference data by two predetermined kinds of coefficients, and generating two chrominance signals based on differences between resulting products;

wherein said step (d) comprises the step (f) of starting sampling the pixel data at a position shifted from previous pixel data by a distance corresponding to a preselected number of pixel data.

15. A method in accordance with claim 14, wherein in said step (d) the pixel data to be added for producing the luminance signal are multiplied by coefficients comprising sensitivity ratios between the color filter segments.

16. A method in accordance with claim 14, wherein said step (f) handles three successive pixel data as a unit and starts sampling the pixel data at a position shifted from a previous unit by a distance corresponding to two units of pixel data.

17. A method in accordance with claim 13, wherein said step (c) comprises the steps of:

(g) sampling and holding, among the pixel data derived from the signal charges mixed and then digitized, a plurality of successive pixel data appearing after a subject point at a time;

(h) multiplying each of the pixel data sampled and held in said step (h) by a particular coefficient, totaling resulting products, and producing a mean of a resulting sum to thereby generate the primary colors R, G and B;

(i) executing gamma correction with the primary colors R, G and B output in said step (h); and (j) generating the luminance signal and the chrominance signals by using corrected primary colors R, G and B output in said step (i).

* * * * *